US011599666B2

(12) United States Patent
Nayak et al.

(10) Patent No.: US 11,599,666 B2
(45) Date of Patent: Mar. 7, 2023

(54) SMART DOCUMENT MIGRATION AND ENTITY DETECTION (71) Applicant: SAP SE, Walldorf (DE)

(72) Inventors: Shiva Prasad Nayak, Bangalore (IN); Srinivas Rao, Bangalore (IN); Anahita Minuchaher Havewala, Bangalore (IN); Suresh Pasumarthi, Bangalore (IN)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 16/924,467

(22) Filed: Jul. 9, 2020

(65) Prior Publication Data
US 2021/0374276 A1  Dec. 2, 2021

(30) Foreign Application Priority Data
May 27, 2020 (IN) .............................. 202011022212

(51) Int. Cl.
G06F 21/62  (2013.01)
G06N 5/04  (2023.01)
(Continued)

(52) U.S. Cl.
CPC .......... G06F 21/6245 (2013.01); G06F 16/93 (2019.01); G06N 5/04 (2013.01); G06N 20/00 (2019.01)

(58) Field of Classification Search
CPC ..... G06F 21/6245; G06F 16/93; G06N 20/00; G06N 5/04
See application file for complete search history.

(56) References Cited

U.S. PATENT DOCUMENTS 8,972,445 B2 * 3/2015 Gorman ................ G06F 40/205
707/771
10,270,882 B2 * 4/2019 Kazi ..................... G06F 40/284
(Continued)

OTHER PUBLICATIONS

Automatic Detection and analysis of DPP entities, Nayak, IEEE, pp. 70-75.*

(Continued)

Primary Examiner — Michael I Ezewoko
(74) Attorney, Agent, or Firm — Buckley, Maschoff & Talwalkar LLC (57) ABSTRACT Systems and methods include extraction of a plurality of clauses from each of a plurality of electronic documents, determination, for each of the plurality of clauses and using a machine-learned algorithm, an associated clause type, identification of one or more data privacy protection entities present within each of one or more of the plurality of clauses, determination, for each of the one or more of the plurality of clauses, of a weighted frequency for each of the one or more data privacy protection entities present within the clause based on a type of the data privacy protection entity, determination of a weighted frequency associated with each of the plurality of electronic documents based on the determined weighted frequency for each of the one or more data privacy protection entities present within clauses of the plurality of electronic documents, and storage of an identifier of each of the plurality of electronic documents in association with a respective determined weighted frequency.

15 Claims, 11 Drawing Sheets (51) Int. Cl.
*G06N 20/00* (2019.01)
*G06F 16/93* (2019.01)

(56) References Cited

U.S. PATENT DOCUMENTS

| | | | |
|---|---|---|---|
| 10,957,433 B2* | 3/2021 | Lucas | G16H 10/60 |
| 2019/0156053 A1* | 5/2019 | Vogel | G06F 21/6245 |
| 2020/0151591 A1* | 5/2020 | Li | G06N 3/08 |

OTHER PUBLICATIONS

Extraction and Disambiguation, Joshi, IEEE, 2018, pp. 1-5.*
Legal Clause Extraction, Shah, IEEE, 2018, pp. 1-3.*
Self-training on refined clause patterns, Du-Thuan, Elsevier, 2017, pp. 686-706.*
Smart Legal Contract Migration, Rao, IEEE, 2019, pp. 65-69.*

* cited by examiner

| Clause Approval | | | | | | |
|---|---|---|---|---|---|---|
| Classified Clauses 510 | | | Clause Details | | | 540 |
| (Approve) Search 530 | | | Name: | Delivery | | |
| ☐ Name 520 Type | | Status | Type: | Delivery terms | | |
| ☐ Delivery | Delivery Terms | Pending Approval | Language: | English | | |
| ☐ Damages Clause | Damages | Pending Approval | Valid From: | Mon Apr 15 2019 | | |
| ☐ Privacy | Confidentiality | Pending Approval | Valid To: | Wed Apr 17 2019 | | |
| ☐ Taxes | Taxes | Pending Approval | Law: | DE, CA | | |
| | | | Owner: | | | |
| | | | Clause Content | | | 550 |
| | | | {CLAUSE TEXT} | | | |

SMART DOCUMENT MIGRATION AND ENTITY DETECTION

CROSS-REFERENCE TO RELATED APPLICATIONS

The present application claims priority to Indian Provisional Application No. 202011022212, filed May 27, 2020, and incorporates said Indian Provisional Application by reference for all purposes.

BACKGROUND

Modern database systems store vast amounts of data for their respective enterprises. The data may include transactional data, master data, unstructured data and other data. The use and re-use of such data is an intergral aspect of enterprise operations.

The data may represent documents such as, for example, legal contracts. Existing hardcopies of documents may be scanned and stored into database systems, but such scanning fails to preserve any substantive or semantic information embodied within the documents. The documents, or selected portions thereof, cannot therefore efficiently be used or re-used by users of such systems. What is needed are systems to efficiently load physical documents into a document management system in a manner that detects semantic information associated with various document portions and allows for independent re-use of such portions as well as electronic access to the content of the original documents.

Regulations such as the General Data Protection Regulation (GDPR) require specific handling of personal or potentially-personal electronic information. This information is typically associated with logical entities (e.g., person, organization, location, geo-political entity) referred to herein as data privacy and protection (DPP) entities. A modern enterprise is typically associated with many DPP entities within a web of complex interrelationships, many of which are defined and/or governed by associated documents, such as contracts. Systems are needed to efficiently identify DPP entities within documents and to determine privacy-weighted associations between the documents and specified parties based on the identified DPP entities.

DETAILED DESCRIPTION

The following description is provided to enable any person in the art to make and use the described embodiments and sets forth the best mode contemplated for carrying out some embodiments. Various modifications, however, will be readily-apparent to those in the art.

Briefly, some embodiments operate to input hardcopies of document, identify clauses within the documents, classify the clauses by type, and tag each clause with metadata identifying its type, associated document, and order within its associated document. Such information may be used to recreate the documents electronically, and also by a document editor to identify clauses to utilize as templates during creation of a new document.

Some embodiments operate to efficiently identify DPP entities within a set of electronic documents, generate a document index to associate the documents with their constituent DPP entities and clause-specific DPP weightings, and generate DPP weight-based dependency relation graphs between named entities and associated documents/clauses/DPP entities.

Figure 1:
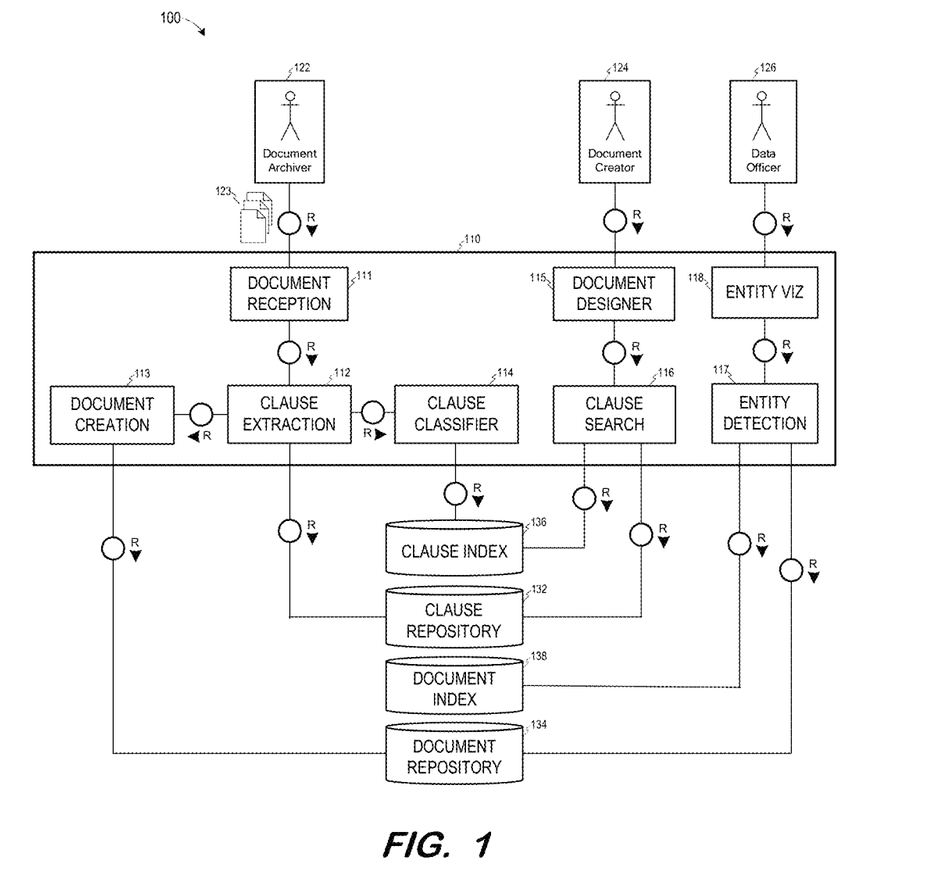
FIG. 1 is a block diagram of an overall architecture according to some embodiments.

FIG. 1 is a block diagram of an architecture of system 100 according to some embodiments. The illustrated elements of system 100 may be implemented using any suitable combination of computing hardware and/or software that is or becomes known. In some embodiments, two or more elements of system 100 are implemented by a single computing device. One or more elements of system 100 may be implemented as a cloud service (e.g., Software-as-a-Service, Platform-as-a-Service).

Generally, application server 110 provides a user interface layer, application logic and an interface to data stores 132 through 138. For example, Web applications executing on application server 110 may receive HyperText Transfer Protocol (HTTP) requests from client applications and return data from data stores 132 through 138 in response thereto. Each component of application server 110 may be implemented by processor-executable program code written in any suitable programming language. Some of such code may be deployed in more than one component of application server 110.

Data stores 132 through 138 may be provided by a database server as is known in the art. Each of data stores 132 through 138 may comprise any combination of volatile memory (e.g., Random Access Memory (RAM)) and non-volatile memory (e.g., fixed disk, Flash memory, non-volatile (RAM)).

According to some embodiments, document archiver 122 accesses document reception component 111 of application server 110 to upload documents 123 to application server 110. For example, document archiver 122 may operate a client device to execute a Web browser and point the Web browser to a Uniform Resource Locator (URL) served by document reception component 111. Document reception component 111 may thereby provide a user interface using which document archiver 122 may upload one or more documents thereto.

Uploading may comprise scanning physical ones of documents 123 to generate images in any known image format, Portable Document Format (PDF) files, or text files. In the latter case, scanning of a physical document may include generating an image and performing optical character recognition on the image. Uploading may also or alternatively comprise transferring text files or word processing files (e.g., Word documents) of documents 123 which document archiver 122 has already on-hand. Document reception component 111 may convert any received non-text formatted documents to text prior to transmission of the documents to clause extraction component 112.

Clause extraction component 112 extracts one or more individual clauses from each document. As described above, documents 123 may comprise legal documents, each of which is composed of several clauses. Each clause may be associated with a different purpose, or type, as will be described below. Clause extraction component 112 stores the text of each extracted clause in clause repository 132, in conjunction with an identifier of the clause. The identifier may comprise a filename, and may indicate the document with which the clause is associated as well as the order of the clause within the document (e.g., "Document2_Clause3").

The extracted clauses may then be handed to document creation component 113, which may rebuild each document into a single text file based on the clause identifiers and store each document, as an electronic text file and/or PDF file, in document repository 134. Storage of the documents in document repository 134 provides an archive of documents 123, and allows for easy retrieval thereof when desired.

Clause classifier 114 classifies each extracted clause by type. Referring to the example of legal documents, possible clause types include confidentiality, arbitration, indemnification, taxes, intellectual property. Classifier 114 may perform such classification programmatically, or may comprise a trained machine-learning model. Examples and training of classifier 114 according to some embodiments will be discussed below.

After classifying each clause, the clauses are indexed into clause index 136 according to type and any other suitable characteristics. Clause index 136 facilitates retrieval of clauses based on type and/or other characteristic.

In this regard, document creator 124 may access document designer component 115 of application server 110 to create documents based on previously-extracted clauses. In this regard, document designer 115 may provide a user interface for constructing documents which includes a search control for inputting search keywords. The search control may call clause search component 116, which in turn searches clause index 136 for clauses which satisfy (strictly or elastically) the search terms. Metadata and other portions of the identified clauses may be presented to document creator 124 and any desired clauses may then be retrieved from clause repository 132.

Entity detection component 117 may detect DPP entities present in the clauses of documents stored in document repository 134. A detailed description of such detection will be provided below. Entity detection may also include determining the clauses in which the DPP entities reside, and a weight associated with the DPP entities of each clause. The weight for a given DPP entity may be based on the clause type and the type of DPP entity. A total DPP weight for a given document may also be determined based on the DPP weights of each clause of the document. Entity detection component 117 may store the DPP entities, DPP weights, clause-specific DPP entities and DPP weights, and other named entities associated with each document in document index 138.

Data officer 126 may, according to some embodiments, access entity visualization component 118 of application server 110 to request a visualization of documents and clauses which are associated with DPP entities and relate to a named entity. For example, data officer 126 may request a visualization of documents containing DPP entities and related to XYZ corporation. Such a visualization may assist data officer 126 in meeting privacy obligations associated with data officer 126's control over the data of XYZ corporation.

According to some embodiments, and as will be described below, a visualization may reflect the weights assigned to each DPP entity of each visualized document. For example, each a document with a highest total DPP weight may be visualized in closer proximity to XYZ corporation than other documents. Similarly, each clause of each document including a DPP entity may be visualized, with clauses associated with higher total DPP weights being visualized differently with respect to their documents than other (i.e., lower-weighted) clauses.

Figure 2:
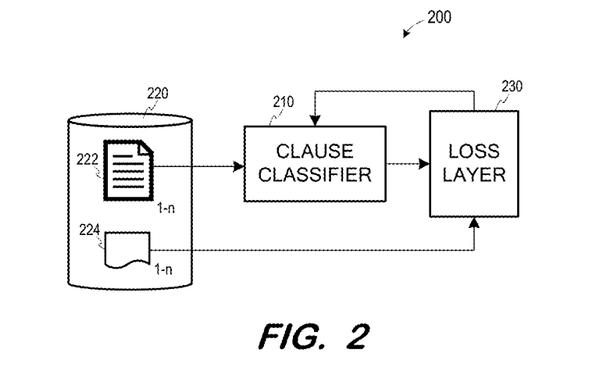
FIG. 2 is a block diagram of an architecture to train an artificial neural network to classify document clauses according to some embodiments.

FIG. 2 illustrates system 200 for training a clause classifier according to some embodiments. Generally, clause classifier 210 may be trained based on training data 220 to receive an input text clause and output a classified clause type based thereon. Clause classifier 210 may execute any trainable classification algorithm that is or becomes known. Examples include logistic regression, Random Forest, and Linear Support Vector Machine.

Clause classifier 210 may comprise a network of neurons which receive input, change internal state according to that input, and produce output depending on the input and the internal state. The output of certain neurons is connected to the input of other neurons to form a directed and weighted graph. The weights as well as the functions that compute the internal state can be modified by a training process based on ground truth data as is known in the art. Clause classifier 210 may comprise any one or more types of artificial neural network that are or become known, including but not limited to convolutional neural networks, recurrent neural networks, long short-term memory networks, deep reservoir computing and deep echo state networks, deep belief networks, and deep stacking networks.

Training data 220 comprises n clauses 222 and n labels 224 corresponding to each of the n clauses 222. The n clauses 222 may be taken from an existing labeled corpus of many documents, with each of the n labels 224 identifying a clause type of its associated clause. In the parlance of neural network training, each of n labels 224 is considered ground truth data corresponding to a respective one of n clauses 222.

According to some embodiments, to facilitate design and training of clause classifier 210, each clause 222 is converted into numerical feature vectors prior to or during input to clause classifier 210. The conversion may employ Term Frequency and Inverse Document Frequency. Term Frequency for a clause may be determined as #count(word)]/[#Total words]. To reduce the weightage of more common words, this number may then be multiplied by a global term which represents the inverse of the number of times the word is used in the set of n clauses.

During training, the numerical feature vectors of each clause 222 are input to clause classifier 210. Based on its initial configuration and design, clause classifier 210 outputs a predicted clause type corresponding to each input clause 222. Loss layer component 230 determines a loss by comparing the predicted code review comments generated based on a clause 222 with the clause type specified by the actual label 224 associated with the clause 222 within training data 220. The loss is determined for each clause 222 in order to determine a total loss. The loss may comprise an L1 loss, and L2 loss, or any other suitable measure of total loss known in the art.

The total loss is back-propagated from loss layer component 230 to clause classifier 210. As is known in the art, the internal weights of clause classifier 210 are modified in response to the total loss. The foregoing process repeats until it is determined that the total loss has reached an acceptable level or training otherwise terminates.

System 200 may comprise any system or systems for training an artificial neural network that are or become known. For example, system 200 may employ supervised learning, unsupervised learning and/or reinforcement learning used as a function approximator as is known in the context of deep neural networks. An RNN (Recurrent Neural Network) with LSTM (Long Short Term Memory) architecture may be used as is known.

According to some embodiments, trained clause classifier 210 implements a function. The function may be characterized as a set of parameter values associated with each node of the network. In one example, the function is represented by parameter values of kernels of an RNN with LSTM. The function (e.g., embodied in parameter values of trained convolutional kernels) may be deployed as is known in the art to another system such as system 100 of FIG. 1.

Figure 3:
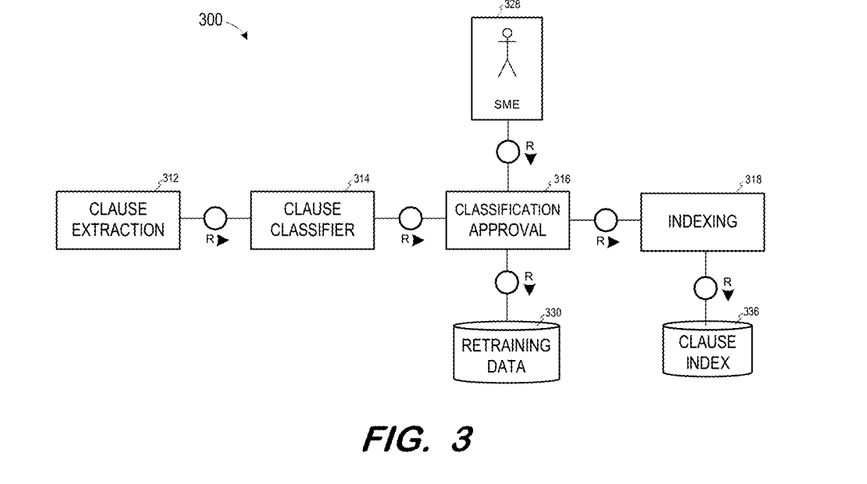
FIG. 3 is a block diagram of a system to classify and index document clauses according to some embodiments.

FIG. 3 illustrates system 300 to generate a clause index using a trained clause classifier according to some embodiments. System 300 may be implemented by system 100 according to some embodiments.

As described above with respect to clause extraction component 112, clause extraction component 312 may operate to extract one or more individual clauses from the electronic text of a document. According to some embodiments, clause extraction component 312 is a Java microservice application providing an API for accepting a ZIP folder containing scanned document images. Clause extraction component 312 may further provide optical character recognition to extract raw text from the scanned images. Some embodiments use the Tess4J library, trained with the text of the expected language, for optical character recognition.

Once the text content of a document is extracted, clause extraction component 312 identifies clauses within the text content. According to some embodiments, line breaks are identified as clause separations. In the case of a series of bullet points, all the bullet points may be considered as part of a single clause.

Each extracted clause is input to clause classifier 314. Clause classifier 314 may comprise a trained network model consisting of a set of hyperparameters defining the network structure, parameter values or kernels representing trained values, and/or any other data sets needed to reproduce the function implemented by the trained neural network on its inputs. As described above, and depending on the inputs used during training, an extracted clause may be converted to a numerical vector prior to input to clause classifier 314.

Clause classifier 314 outputs a clause type per its trained function. In some embodiments, clause classifier outputs, for each of a plurality of clause types, a probability that the input clause is of the clause type. The clause type associated with the highest probability may be determined as the output (i.e., predicted) clause type.

According to system 300, the clause and clause type are received by classification approval component 316. In this regard, some embodiments present the clause and the predicted clause type to subject matter expert 328 to verify the accuracy of the predicted clause type. If the predicted clause type is incorrect, subject matter expert 328 may indicate a correct clause type, which then becomes associated with the clause. In some embodiments, this verification may be required only in cases where the clause type is predicted with a probability lower than a particular threshold probability, or when two or more clause types are predicted with substantially similar probabilities.

If the predicted clause type is incorrect and subject matter expert 328 indicates a correct clause type, the clause and the correct clause type are stored in retraining data 330. Retraining data 330 may be combined with training data 220 of FIG. 2 to retrain a new clause classifier 314, at any suitable time (e.g., after a certain amount of retraining data are collected), to improve the accuracy of classification.

Once the type of a clause is confirmed, indexing component 318 indexes the clause into clause index 336 based on its type and any other suitable characteristics, including but not limited to the type of document from which the clause was extracted. Clause index 336 thereby facilitates retrieval of clauses based on type and/or other characteristic.

Figure 4:
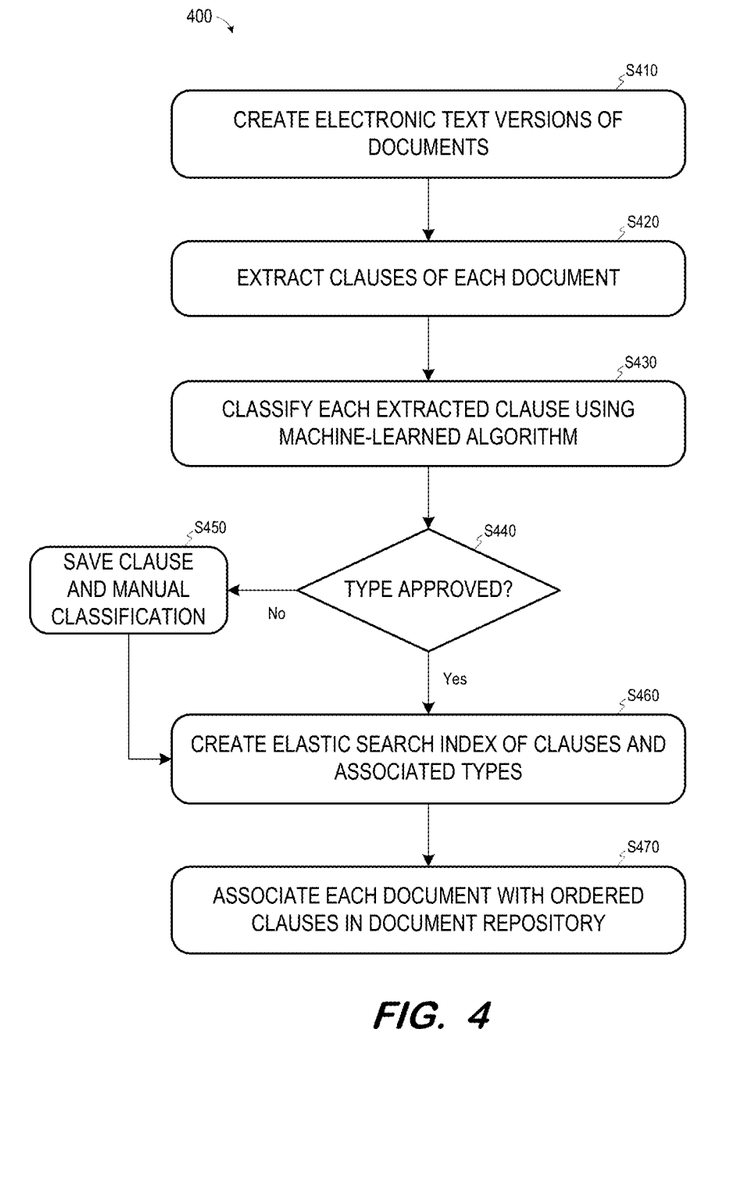
FIG. 4 is a flow diagram of a process to classify and index document clauses according to some embodiments.

FIG. 4 comprises a flow diagram of process 400 to classify and index document clauses according to some embodiments.

Initially, electronic text versions of documents are created at S410. For example, document archiver 122 may access document reception component 111 of application server 110 to upload documents 123 to application server 110. Uploading may comprise scanning physical ones of documents 123 to generate images in any known image format, Portable Document Format (PDF) files, or text files. In the latter case, scanning of a physical document may include generating an image and performing optical character recognition on the image. Document reception component 111 may convert any received non-text formatted documents to text at S410.

At S420, one or more individual clauses are extracted from each document. Clause extraction component 312 may operate at S420 to identify line breaks within each document and identify text portions prior to and after each line break as separate clauses. Other suitable systems for identifying clauses may be employed in some embodiments.

Next, at S430, each extracted clause is classified into a clause type using a machine-learned algorithm. The algorithm may be implemented by a trained classification network consisting of a set of hyperparameters defining the network structure, parameter values or kernels representing values learned during training, and any other data sets needed to reproduce the function implemented by the trained network on its inputs.

Figure 5:
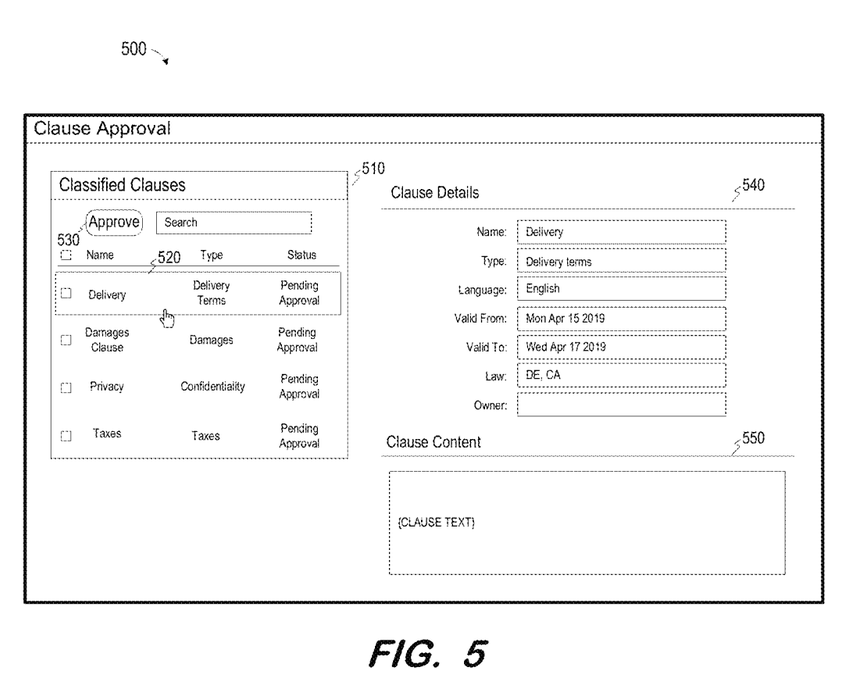
FIG. 5 illustrates a user interface to approve or amend clause classifications according to some embodiments.

The classified type is presented for approval at S440. FIG. 5 depicts user interface 500 which may be used to implement an approval process in some embodiments. User interface 500 may be presented by a Web browser of a user system in communication with classification approval component 316 of system 300. In this regard, classification approval component 316 may comprise server-side JavaScript to interact with client-side code executing within a virtual machine of the Web browser.

User interface 500 shows list 510 of classified clauses. Each listed clause has is shown in association with a clause type predicted by the machine-learned algorithm of S440. In the example of FIG. 5, clause 520 is selected, resulting in display of metadata associated with the clause in clause details area 540. Clause content area 550 may further present the actual text of the clause. The information shown in areas 540 and 550 may facilitate the decision of subject matter expert 328 of whether to approve the predicted clause type.

Approve control 530 may be selected to approve the clause type associated with a selected clause. If the clause type is not approved, embodiments may provide further interface controls to manually classify the clause as associated with a different clause type. In the latter case, flow proceeds to S450 to save the clause and the manual classification for future classifier retraining.

Flow proceeds from S450 (or from S440 if the classified clause type is approved) to S460 to create an elastic search index of the clauses which is searchable according to type and any other suitable characteristics. The elastic search index may be used by a document designer to facilitate retrieval of clauses based on type and/or other characteristic.

The documents are stored in an electronic format at S470. For example, document creation component 113 may rebuild each document into a single text file based on the clause identifiers and store each document, as an electronic text file and/or PDF file, in document repository 134. Also stored in conjunction with each document are indications of its constituent clauses and their relative order. Such information may facilitate rebuilding of a document based only on the clauses stored in clause repository 132.

Figure 6:
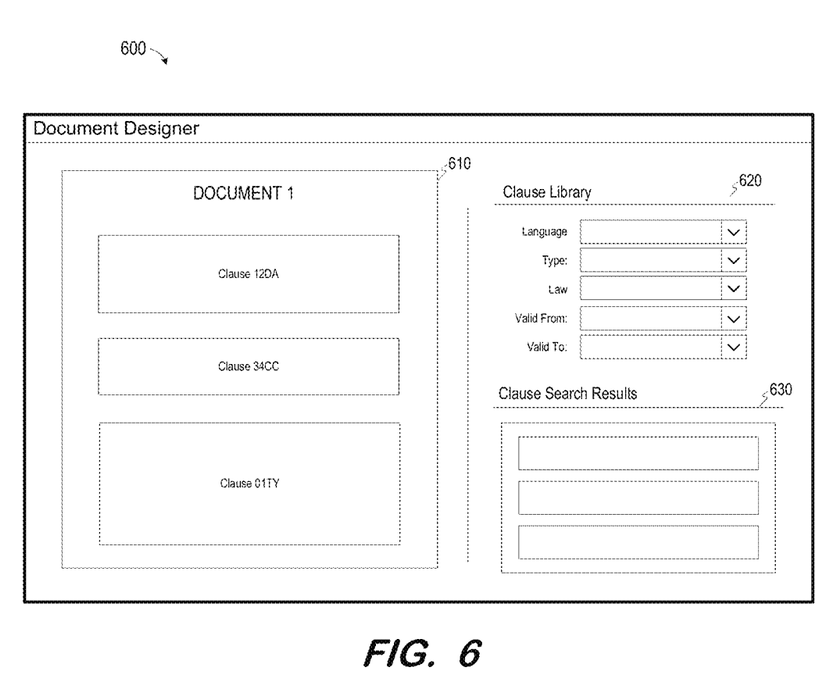
FIG. 6 illustrates a user interface of a document creation application using classified clauses according to some embodiments.

FIG. 6 depicts user interface 600 of a document designer application according to some embodiments. User interface 600 may be presented by a Web browser of a user system in communication with document designer component 115 of system 100. Document designer component 115 may comprise server-side JavaScript to interact with corresponding client-side code executing within a virtual machine of the Web browser.

According to the FIG. 6 example, user interface 600 includes document creation area 610 for illustrating a document which is currently being designed/edited. Area 610 depicts each clause of the document. The text of each depicted clause may be presented in area 610, along with an identifier of the clause.

Search area 620 allows a document creator to search for clauses stored in clause repository 132 and indexed in clause index 136. Search area 620 includes drop-down input fields for specifying search parameters which may be used by clause search component 116 to search clause index 136 and identify corresponding clauses of clause repository 132. As mentioned above, the clause search component 116 may execute fuzzy or elastic searches of index 136.

Results of the search (i.e., identified clauses of clause repository 132) are presented in area 630 of interface 600. The document creator may select one or more of the search results for inclusion in the document shown in area 610. A document created using retrieved clauses of clause repository 132 may then be stored in document repository 134.

Figure 7:
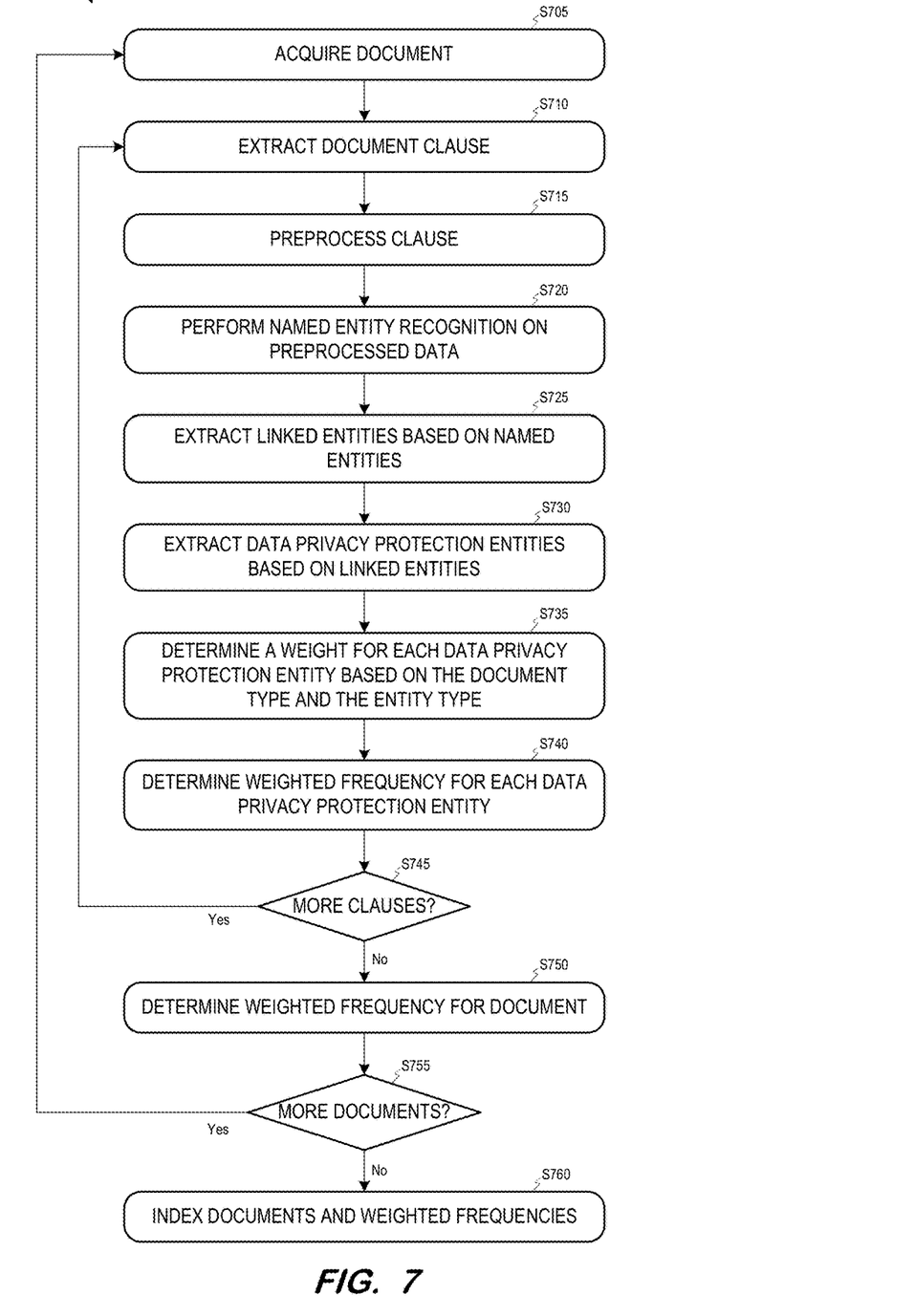
FIG. 7 is a flow diagram of a process to detect DPP entities within documents and determine weighted frequencies associated with DPP entities within clauses and documents according to some embodiments.

FIG. 7 is a flow diagram of a process to detect DPP entities within documents and determine weighted frequencies associated with DPP entities within clauses and documents according to some embodiments. This detection and weighting facilitates an understanding of an entity's level of association with various documents (e.g., legal contracts) and the taking of suitable steps to abide by GDPR rules and regulations.

Figure 8:
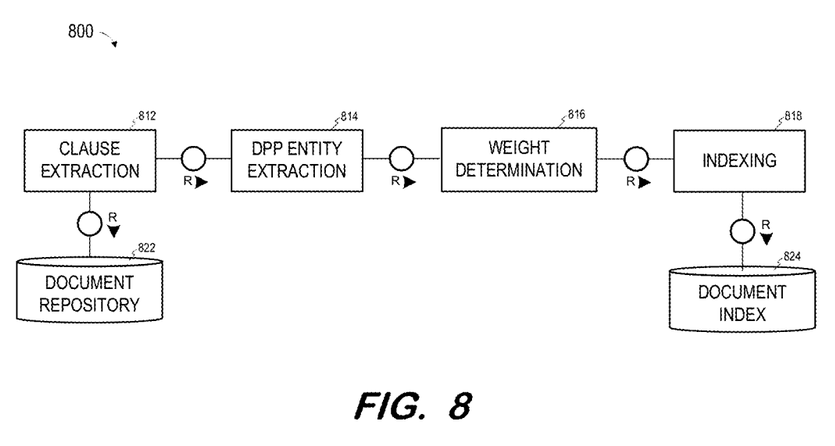
FIG. 8 is a block diagram of a system to detect DPP entities within documents and determine weighted frequencies associated with DPP entities within clauses and documents according to some embodiments.

FIG. 8 is a block diagram of system 800 to detect DPP entities within documents and determine weighted frequencies associated with DPP entities within clauses and documents according to some embodiments. Process 700 will be described with respect to the components of FIG. 8, although embodiments are not limited thereto. In some embodiments, entity detection component 117 of application server 110 embodies one or more of the components of system 800.

A document is initially acquired at S705. For example, clause extraction component 812 of system 800 may acquire a document from document repository 822. The acquired document may be a first document of a set of documents to be subjected to process 700. Clause extraction component 812 may then extract a clause from the acquired document at S710. In some embodiments, the clause may be extracted using techniques as described above. The clause may be extracted in some embodiments by identifying a clause associated with the document in clause repository 132 and retrieving the clause therefrom.

The clause is subjected to known pre-processing at S715. For example, S715 may comprise removal of stop words and special characters, and stemming. Such pre-processing may advantageously reduce the search space of subsequent named entity recognition at S720. Named entity recognition at S720 may consist of part-of-speech tagging on the pre-processed clause and extraction of named entities (e.g., PERSON, ORGANIZATION, MONEY, DATE, TIME, GEO_POLITICAL ENTITY) from the tagged words using a prebuilt dictionary, The extracted named entities may be relevant to the present enterprise or not. For example, "Washington" can be a surname or a capital city. Accordingly, entity linking and entity disambiguation may be performed at S725 using an ontology knowledgebase (e.g., Wikipedia/DBPedia) to extract classified linked entities.

Domain relevant DPP entities are extracted from these classified linked entities at S730. For example, in a rental agreement contract document, PERSON, LOCATION, MONEY, DATE and TIME entities may be considered more relevant than other classified linked entities in the DPP context and may be afforded a higher weight in the determination of DPP entities.

DPP entity extraction component 814 may execute S715 through S730 according to some embodiments. Next, at S735, weight determination component 816 may determine a weight for each identified DPP entity of the clause.

The weight is determined based on the document type (e.g., rental agreement contract) and the DPP entity type (e.g., PERSON, ORGANIZATION). The weights may be determined from a prestored array created by a subject matter expert which associates document type/entity type tuples with various weights. For example, a PERSON DPP entity type in a rental agreement contract may be assigned a weight of 1 while a LOCATION DPP entity type in a rental agreement contract may be assigned a weight of 0.5. An ORGANIZATION DPP entity type in a purchasing agreement contract may be assigned a weight of 1 while a DATE DPP entity type in a purchasing agreement contract may be assigned a weight of 0.8.

A weighted frequency is determined for each DPP entity at S740. The weighted frequency is determined based on the number of times a DPP entity appears in the clause and the weight determined for the DPP entity at S735. For example, if a DATE DPP entity appears 3 times in the clause and the document is a purchasing agreement contract, the weighted frequency for the DATA DPP entity may be determined as (3*0.8)=0.24. Embodiments for determining the weighted frequency are not limited to simple multiplication.

It is determined at S745 if the document includes additional clauses which have not yet been processed as described above. If so, flow returns to S710 to acquire a next clause of the document. Flow continues from S715 through S740 to determine weighted frequencies for each DPP entity of the next clause. Flow proceeds from S745 to S750 once all clauses of the document have been processed.

At S750, a weighted frequency of the document is determined based on the weighted frequencies of each DPP entity of the document. For example, the weighted frequency of the document may be calculated as the sum of the weighted frequencies of each DPP entity of each clause of the document. At S755, it is determined if additional documents remain to be analyzed. If so, flow returns to S705 and proceeds as described above to determine a weighted frequency of a next document.

Flow proceeds from S755 to S760 once all documents to be processed have been processed. The documents and the weighted frequencies thereof are indexed at S760. The indexing may be performed by indexing component 818 with respect to document index 834.

Index 834 may index and thereby allow fast searching of documents by document type, document properties, linked entities, DPP entities, clause identifier, document weighted frequency, DPP weighted frequency at clause level, and any other suitable metadata. A search on index 834 may therefore provide search results consisting of identifiers of documents stored in document repository 832.

Figure 9:
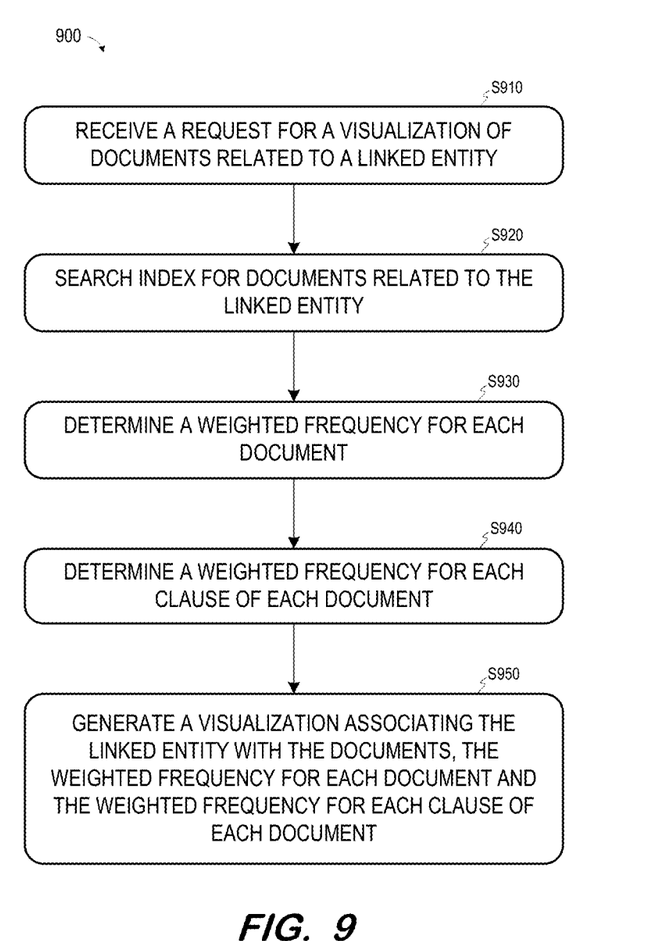
FIG. 9 is a flow diagram of a process to generate a visualization based on weighted frequencies associated with DPP entities within clauses and documents according to some embodiments.

FIG. 9 is a flow diagram of process 900 to generate a visualization based on weighted frequencies associated with DPP entities within clauses and documents according to some embodiments. Process 900 may be embodied by entity visualization component 118.

A request for a visualization of documents related to a linked entity is received at S910. For example, data officer 126 may access entity visualization component 118 of application server 110 to request a visualization of documents and clauses which are associated with DPP entities and relate to XYZ corporation.

In response to the request, a document index is searched for documents related to the linked entity at S920. As described above, document index 824 may index documents of repository 822 based on, among other characteristics, linked entities named therein. S920 may therefore comprise querying document index 824 for documents related to the linked entity.

A weighted frequency of each document retrieved at S920 is determined at S930. The weighted frequency of a document may comprise the sum of weighted frequencies of each DPP entity of each clause of the document. The weighted frequency of each document may be calculated on-the-fly at S930 as described above with respect to S735, S740 and S750 or may be pre-stored in the document index (or document repository) and acquired therefrom at S930.

A weighted frequency of each clause of each document is determined at S940. The weighted frequency of a clause may comprise the sum of weighted frequencies of each DPP entity of the clause. The weighted frequency of each clause may be calculated on-the-fly at S940 as described above with respect to S735 and S740 or may be pre-stored in the document index (or document repository) and acquired therefrom at S940.

Next, at S950, a visualization is generated associating the linked entity with the documents. The visualization also may associate the linked entity with the weighted frequency of each document and the weighted frequency of each clause of each document. For example, the documents may be ranked by weight, each clause within each document may be ranked by weight, and the visualization may reflect these rankings.

Figure 10:
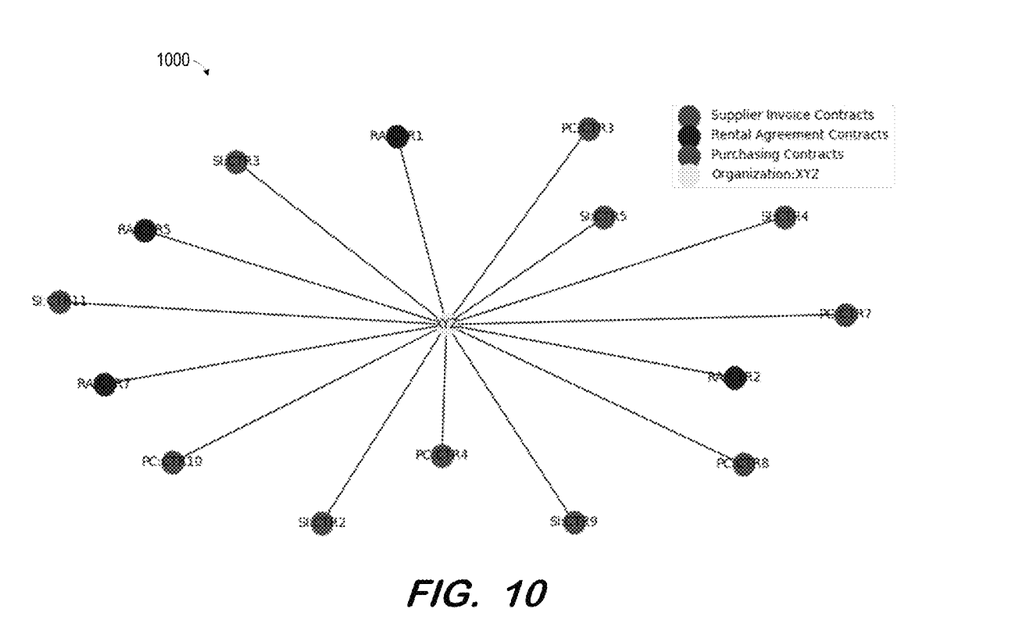
FIG. 10 is a visualization associating an entity with documents based on weighted frequencies associated with the documents according to some embodiments.

FIG. 10 depicts visualization 1000 associating an entity (i.e., organization XYZ) with fifteen documents based on weighted frequencies associated with the documents according to some embodiments. The distance from the center icon representing organization XYZ to an icon representing a given document is based on the weighted frequency associated with the given document. For example, the distance may be inversely related to the weighted frequency.

Figure 11:
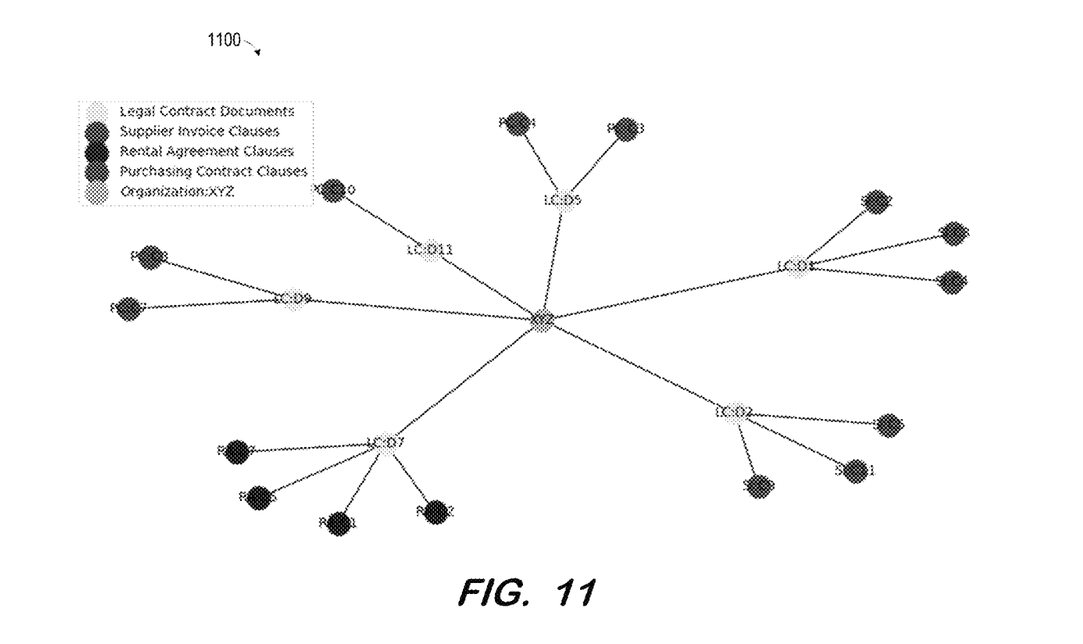
FIG. 11 is a visualization associating an entity with documents and clauses based on weighted frequencies associated with the documents and clauses according to some embodiments.

FIG. 11 depicts visualization 1100 associating organization XYZ with documents and clauses based on weighted frequencies associated with the documents and clauses according to some embodiments. Again, the distance from the center icon representing organization XYZ to an icon representing a given document (LC:Dx) is based on the weighted frequency associated with the given document. Moreover, the distance from an icon representing a given document to each icon representing a clause of the document containing DPP entities is based on the weighted frequency associated with each clause.

Figure 12:
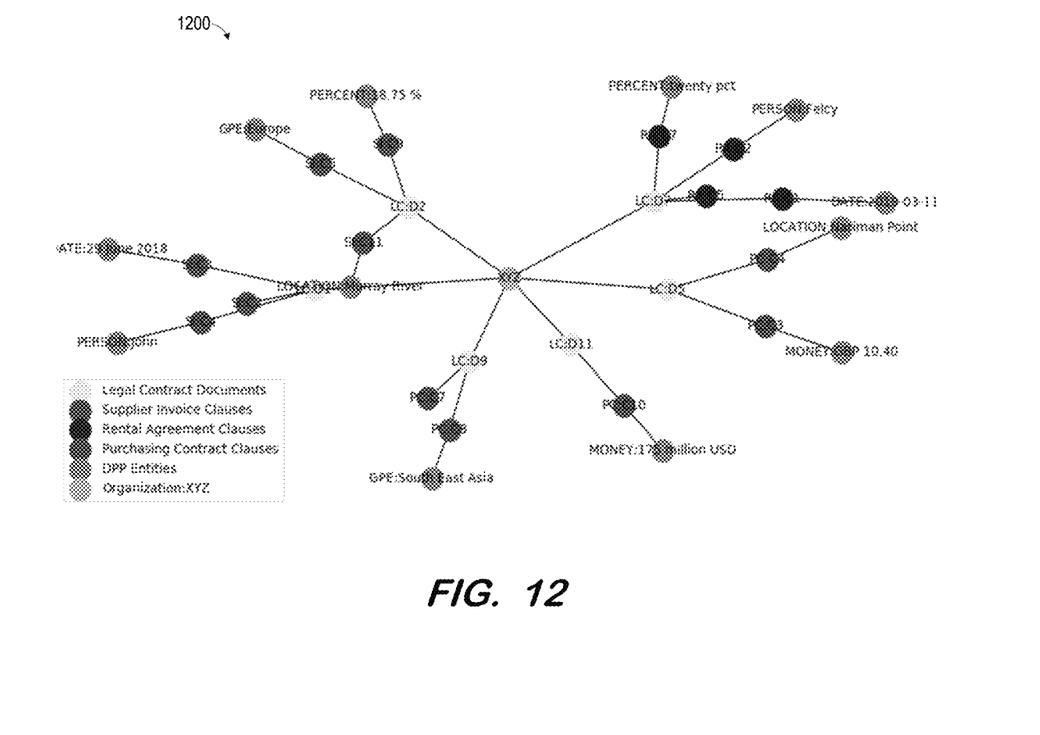
FIG. 12 is a visualization associating an entity with documents, clauses and DPP entities based on weighted frequencies associated with the documents and clauses according to some embodiments.

Finally, FIG. 12 depicts visualization 1300 associating an entity with documents, clauses and DPP entities based on weighted frequencies associated with the documents and clauses according to some embodiments. Icons representing the clauses are shown connected to icons representing (and labeled with) the DPP entities of the clause. The distance from the center icon representing organization XYZ to an icon representing a given document (LC:Dx) is based on the weighted frequency associated with the given document, and the distance from an icon representing a given document to each icon representing a clause of the document containing DPP entities is based on the weighted frequency associated with each clause.

Figure 13:
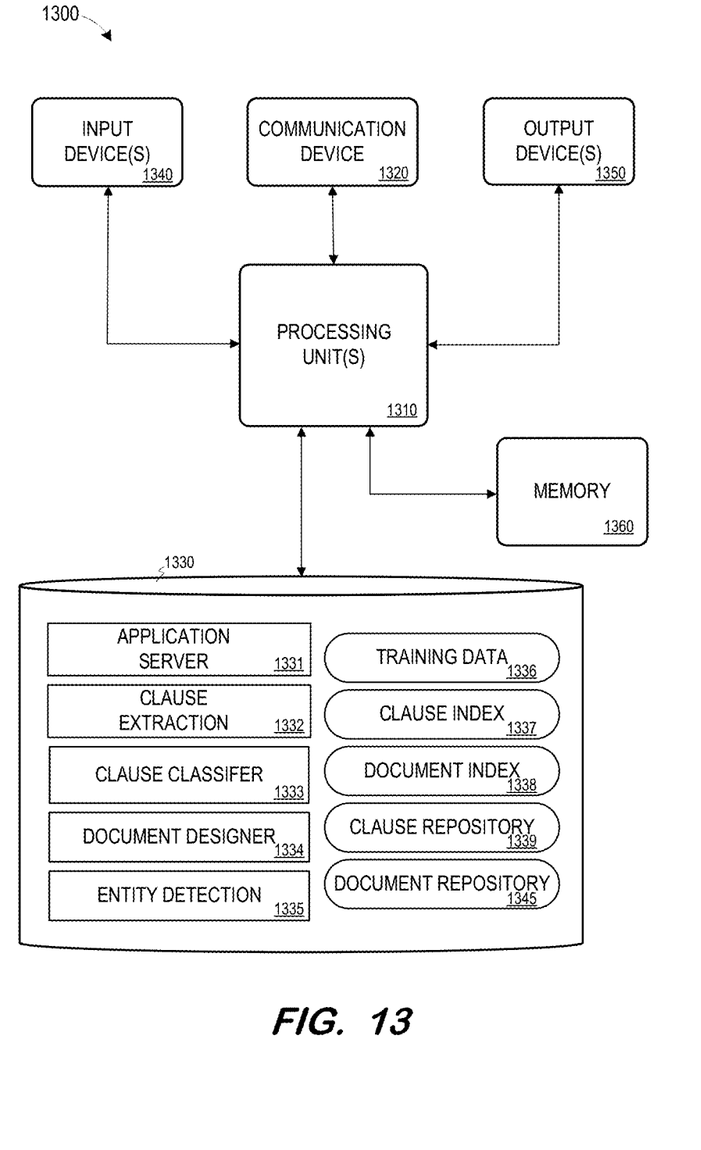
FIG. 13 is a block diagram of a hardware system providing an application platform according to some embodiments.

FIG. 13 is a block diagram of hardware system 1300 providing an application platform according to some embodiments. Hardware system 1300 may comprise a general-purpose computing apparatus and may execute program code to perform any of the functions described herein. Hardware system 1300 may comprise an implementation of application server 110 and a database server in some embodiments. Hardware system 1300 may include other unshown elements according to some embodiments.

Hardware system 1300 includes processing unit(s) 1310 operatively coupled to communication device 1320, data storage device 1330, one or more input devices 1340, one or more output devices 1350 and memory 1360. Communication device 1320 may facilitate communication with external devices, such as an external network, the cloud, or a data storage device. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into hardware system 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, and RAM devices, while memory 1360 may comprise a RAM device.

Application server 1331 and components 1332 through 1335 each comprise program code executed by processing unit(s) 1310 to cause server 1300 to perform any one or more of the processes described herein. Embodiments are not limited to execution of these processes by a single computing device.

Data storage device 1330 also stores training data 1336 (which may be occasionally supplemented by retraining data as described above) indices 1337 and 1338 and repositories 1339 and 1345 as described above. Data storage device 1330 may also store data and other program code for providing additional functionality and/or which are necessary for operation of hardware system 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
    a memory storing processor-executable process steps;
    a processing unit to execute the processor-executable process steps to cause the system to:
    extract a plurality of clauses from each of a plurality of electronic documents;
    determine an associated clause type for each of the plurality of clauses extracted from one of the documents, wherein the determination is made using a machine-learned algorithm;
    identify one or more data privacy protection entities present within each of one or more of the plurality of clauses;
    for each of the one or more of the plurality of clauses, determine a weighted frequency for each of the one or more data privacy protection entities present within the clause based on a type of the data privacy protection entity;
    determine a weighted frequency associated with each of the plurality of electronic documents based on the determined weighted frequency for each of the one or more data privacy protection entities present within clauses of the plurality of electronic documents; and
    store an identifier of each of the plurality of electronic documents in association with a respective determined weighted frequency.

2. A system according to claim 1, the processing unit to execute the processor-executable process steps to cause the system to:
    receive a request for a visualization of electronic documents associated with an entity; and
    in response to the request:
        determine one or more of the plurality of electronic documents associated with the request;
        determine a stored weighted frequency associated with each of the determined one or more of the plurality of electronic documents; and
        generate a visualization of the determined one or more of the plurality of electronic documents, the visualization representing the stored weighted frequency associated with each of the determined one or more of the plurality of electronic documents.

3. A system according to claim 2, wherein determination of a weighted frequency for each of the one or more data privacy protection entities comprises determination of a data privacy protection entity type, a document type of a document in which a data privacy protection entity is present, and a weight associated with the data privacy protection entity type and document type.

4. A system according to claim 3, wherein a weight associated with a first data privacy protection entity type and a first document type is different from a weight associated with a second data privacy protection entity type and the first document type.

5. A system according to claim 1, wherein determination of an associated clause type for a clause comprises:
    inputting the clause to a machine-learned algorithm to generate a predicted clause type;
    presenting the predicted clause type to a reviewer;
    receiving a revised clause type from the reviewer;
    storing the clause and the revised clause type; and
    retraining the machine-learned algorithm based at least in part on the stored clause and the revised clause type.

6. A computer-implemented method comprising:
    extracting a plurality of clauses from each of a plurality of electronic documents;
    determining an associated clause type for each of the plurality of clauses extracted from one of the documents, wherein the determination is made using a trained artificial neural network;
    identifying one or more data privacy protection entities present within each of one or more of the plurality of clauses;
    for each of the one or more of the plurality of clauses, determining a weighted frequency for each of the one or more data privacy protection entities present within the clause based on a type of the data privacy protection entity;
    determining a weighted frequency associated with each of the plurality of electronic documents based on the determined weighted frequency for each of the one or more data privacy protection entities present within clauses of the plurality of electronic documents; and
    storing an identifier of each of the plurality of electronic documents in association with a respective determined weighted frequency.

7. A method according to claim 6, further comprising:
receiving a request for a visualization of electronic documents associated with an entity; and
in response to the request:
  determining one or more of the plurality of electronic documents associated with the request;
  determining a stored weighted frequency associated with each of the determined one or more of the plurality of electronic documents; and
  generating a visualization of the determined one or more of the plurality of electronic documents, the visualization representing the stored weighted frequency associated with each of the determined one or more of the plurality of electronic documents.

8. A method according to claim 7, wherein determining a weighted frequency for each of the one or more data privacy protection entities comprises determining a data privacy protection entity type, a document type of a document in which a data privacy protection entity is present, and a weight associated with the data privacy protection entity type and document type.

9. A method according to claim 8, wherein a weight associated with a first data privacy protection entity type and a first document type is different from a weight associated with a second data privacy protection entity type and the first document type.

10. A method according to claim 6, wherein determining an associated clause type for a clause comprises:
inputting the clause to a machine-learned algorithm to generate a predicted clause type;
presenting the predicted clause type to a reviewer;
receiving a revised clause type from the reviewer;
storing the clause and the revised clause type; and
retraining the machine-learned algorithm based at least in part on the stored clause and the revised clause type.

11. A non-transitory computer-readable medium storing processor-executable process steps executable by a processing unit of a computing system to cause the computing system to:
extract a plurality of clauses from each of a plurality of electronic documents;
determine an associated clause type for each of the plurality of clauses extracted from one of the documents, wherein the determination is made using a machine-learned algorithm;
identify one or more data privacy protection entities present within each of one or more of the plurality of clauses;
for each of the one or more of the plurality of clauses, determine a weighted frequency for each of the one or more data privacy protection entities present within the clause based on a type of the data privacy protection entity;
determine a weighted frequency associated with each of the plurality of electronic documents based on the determined weighted frequency for each of the one or more data privacy protection entities present within clauses of the plurality of electronic documents; and
store an identifier of each of the plurality of electronic documents in association with a respective determined weighted frequency.

12. A medium according to claim 11, the processing unit to execute the processor-executable process steps to cause the system to:
receive a request for a visualization of electronic documents associated with an entity; and
in response to the request:
  determine one or more of the plurality of electronic documents associated with the request;
  determine a stored weighted frequency associated with each of the determined one or more of the plurality of electronic documents; and
  generate a visualization of the determined one or more of the plurality of electronic documents, the visualization representing the stored weighted frequency associated with each of the determined one or more of the plurality of electronic documents.

13. A medium according to claim 12, wherein determination of a weighted frequency for each of the one or more data privacy protection entities comprises determination of a data privacy protection entity type, a document type of a document in which a data privacy protection entity is present, and a weight associated with the data privacy protection entity type and document type.

14. A medium according to claim 13, wherein a weight associated with a first data privacy protection entity type and a first document type is different from a weight associated with a second data privacy protection entity type and the first document type.

15. A medium according to claim 11, wherein determination of an associated clause type for a clause comprises:
inputting the clause to a machine-learned algorithm to generate a predicted clause type;
presenting the predicted clause type to a reviewer;
receiving a revised clause type from the reviewer;
storing the clause and the revised clause type; and
retraining the machine-learned algorithm based at least in part on the stored clause and the revised clause type.

* * * * *